(12) United States Patent
Vogel et al.

(10) Patent No.: US 9,882,892 B1
(45) Date of Patent: Jan. 30, 2018

(54) USER AUTHORIZATION USING INTENT TOKENS

(71) Applicant: INTUIT INC., Mountain View, CA (US)

(72) Inventors: Peter Vogel, Santa Clara, CA (US); Vinod K. Nair, Belmont, CA (US); Wing Ming Brigitte Chan, Milpitas, CA (US); Kishore Jonnalagedda, San Jose, CA (US)

(73) Assignee: INTUIT INC., Mountain View, CA (US)

( * ) Notice: Subject to any disclaimer, the term of this patent is extended or adjusted under 35 U.S.C. 154(b) by 268 days.

(21) Appl. No.: 14/307,982

(22) Filed: Jun. 18, 2014

(51) Int. Cl.
H04L 29/06 (2006.01)
G06F 21/62 (2013.01)
H04L 9/32 (2006.01)

(52) U.S. Cl.
CPC ........ *H04L 63/083* (2013.01); *G06F 21/6236* (2013.01); *H04L 9/32* (2013.01); *H04L 9/3213* (2013.01); *H04L 63/0807* (2013.01); *H04L 63/10* (2013.01); *H04L 63/18* (2013.01)

(58) Field of Classification Search
CPC ....... H04L 63/08; H04L 63/083; H04L 63/10; H04L 63/18; H04L 63/0807; H04L 9/3213; H04L 9/32; G06F 21/6236
See application file for complete search history.

(56) References Cited

U.S. PATENT DOCUMENTS

| | | | |
|---|---|---|---|
| 9,038,152 B1* | 5/2015 | Vazquez et al. ................. 726/6 |
| 2007/0033148 A1* | 2/2007 | Cahill ................. G06Q 20/367 705/65 |
| 2008/0086767 A1* | 4/2008 | Kulkarni ................. H04L 63/08 726/9 |
| 2009/0328177 A1* | 12/2009 | Frey ..................... H04L 9/3213 726/9 |
| 2010/0125511 A1* | 5/2010 | Jouret ..................... G06F 21/10 705/26.1 |
| 2012/0331529 A1* | 12/2012 | Ibel ..................... G06F 21/6218 726/4 |
| 2013/0086669 A1* | 4/2013 | Sondhi et al. ..................... 726/8 |
| 2013/0262857 A1* | 10/2013 | Neuman et al. ............... 713/155 |
| 2014/0223516 A1* | 8/2014 | Vongsouvanh ..... H04L 63/0492 726/4 |
| 2015/0134956 A1* | 5/2015 | Stachura et al. ............... 713/168 |
| 2015/0304847 A1* | 10/2015 | Gong et al. ..................... 455/411 |
| 2016/0197904 A1* | 7/2016 | Taratine .................. G06Q 50/01 726/4 |

* cited by examiner

*Primary Examiner* — Nelson Scott Giddins
(74) *Attorney, Agent, or Firm* — Patterson + Sheridan, LLP

(57) ABSTRACT

The disclosed embodiments provide a system that enables access to a resource. During operation, the system obtains, from a first service, a request for access to the resource on a second service by a user using the first service. Next, the system provides, in a response to the request, an intent token for accessing the resource by the user to the first service. Upon receiving the intent token from an authorized user on the second service, the system enables access to the resource on the second service for the user on the first service.

11 Claims, 7 Drawing Sheets

Paste this passcode into QuickBooks

It's simple! Here's how:

1. Copy this passcode:    @ 1 6 4 2 7 8 0 4    ⟵ 302
2. Open App Center in QuickBooks. (Go to Help menu > App Center)
3. Paste in your passcode.

⟵ 304

Or skip passcode by signing into QuickBooks

If you know your Intuit Account, skip the passcode and sign in. ⟵ 306

FIG. 3A

USER AUTHORIZATION USING INTENT TOKENS

RELATED APPLICATION

The subject matter of this application is related to the subject matter in a co-pending non-provisional application by inventors Timothy E. Hobson, Shrisha Radhakrishna, Kishore Jonnalagedda, Soumendra Daas, Bibhakar Ranjan, and Douglas L. Foiles, entitled "Transitioning a Logged-In State from a Native Application to Any Associated Web Resource," having Ser. No. 13/762,168, and filing date 7 Feb. 2013.

BACKGROUND

Related Art

The disclosed embodiments relate to techniques for authorizing user access to resources. More specifically, the disclosed embodiments relate to techniques for performing user authorization using intent tokens.

User accounts and/or resources are typically accessed through a computing device with network connectivity. For example, a user may use a laptop computer to access data and features provided by a natively installed and/or web-based accounting application. Furthermore, access to a user account and the associated resources is typically only granted after valid authentication credentials are provided by the user. For example, the user may be required to input a valid login and password to an accounting application before the user is allowed to access the feature and/or data associated with the login and password. Because such authentication credentials may be used to both identify the user and prevent unauthorized access to the user account, knowledge of the authentication credentials should be restricted to authorized users of the online account.

However, access to resources provided by an application may sometimes be required by users who do not have the appropriate authentication credentials. As a result, the users may manually request approval from other users who are authorized to grant access to the resources. For example, an employee in a company may wish to use a third-party expense-reporting application with the company's accounting software. However, the employee may not have a user account with the accounting software that authorizes the employee to link the expense-reporting application with the accounting software. Instead, the employee may be required to contact a supervisor for approval to link the expense-reporting application with the accounting software, and then walk the supervisor through the process of linking the expense-reporting application with the accounting software. Alternatively, the employee may obtain the supervisor's authentication credentials (e.g., login and password) with the accounting software to approve the link on the supervisor's behalf, which may be a security risk and/or violate the company's internal policies.

Consequently, secure access to resources on applications by unauthorized users may be facilitated by mechanisms for streamlining the approval of such access by authorized users of the applications.

SUMMARY

The disclosed embodiments provide a system that enables access to a resource. During operation, the system obtains, from a first service, a request for access to the resource on a second service by a user using the first service. Next, the system provides, in a response to the request, an intent token for accessing the resource by the user to the first service. Upon receiving the intent token from an authorized user on the second service, the system enables access to the resource on the second service for the user on the first service.

In some embodiments, the system also provides information about the request to the authorized user after receiving the intent token from the authorized user, and obtains approval for the request from the authorized user prior to enabling access to the resource for the user on the first service.

In some embodiments, the system also includes a mechanism for transmitting the intent token from the user to the authorized user in the response.

In some embodiments, the mechanism includes at least one of an email, a Short Message Service (SMS) message, and an instant message.

In some embodiments, enabling access to the resource on the second service for the user on the first service includes establishing a connection between the first and second services, and using the connection to enable access to the resource on the second service for the user on the first service.

In some embodiments, the authorized user is authenticated with the second service.

In some embodiments, the intent token includes a passcode.

In some embodiments, the first and second services include a web service and a native application In some embodiments, the request includes a request token.

BRIEF DESCRIPTION OF THE FIGURES

FIG. 3A shows an exemplary screenshot in accordance with the disclosed embodiments.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The disclosed embodiments provide a method and system for enabling access to a resource. The resource may be provided by a service such as a native application and/or web service. For example, the resource may include data and/or one or more features associated with the native application and/or web service.

More specifically, the disclosed embodiments provide a method and system for enabling, for a user on a first service, access to a resource on a second service without requiring the user to authenticate with the second service. Instead, the user may be provided an intent token for accessing the resource in response to the user's request to access the resource from the first service. The intent token may be a passcode and/or other data element that may be transmitted and/or copied between users and/or services. In turn, the intent token may be provided by an authorized user on the second service to enable access to the resource for the user on the first service. For example, the authorized user may be authenticated with the second service and have the capability to approve or deny access to a set of resources on the second service by other users. The authorized user may obtain the intent token from the user through a communications mechanism such as email, Short Message Service (SMS), and/or instant message and provide the intent token to the second service to approve the request. By using the intent token to approve access to the resource for the user, the authorized user may bypass both the submission of authentication credentials for accessing the resource on the second service to the first service and a manual process of linking the first and second services to enable access to the resource for the user on the first service.

Figure 1:
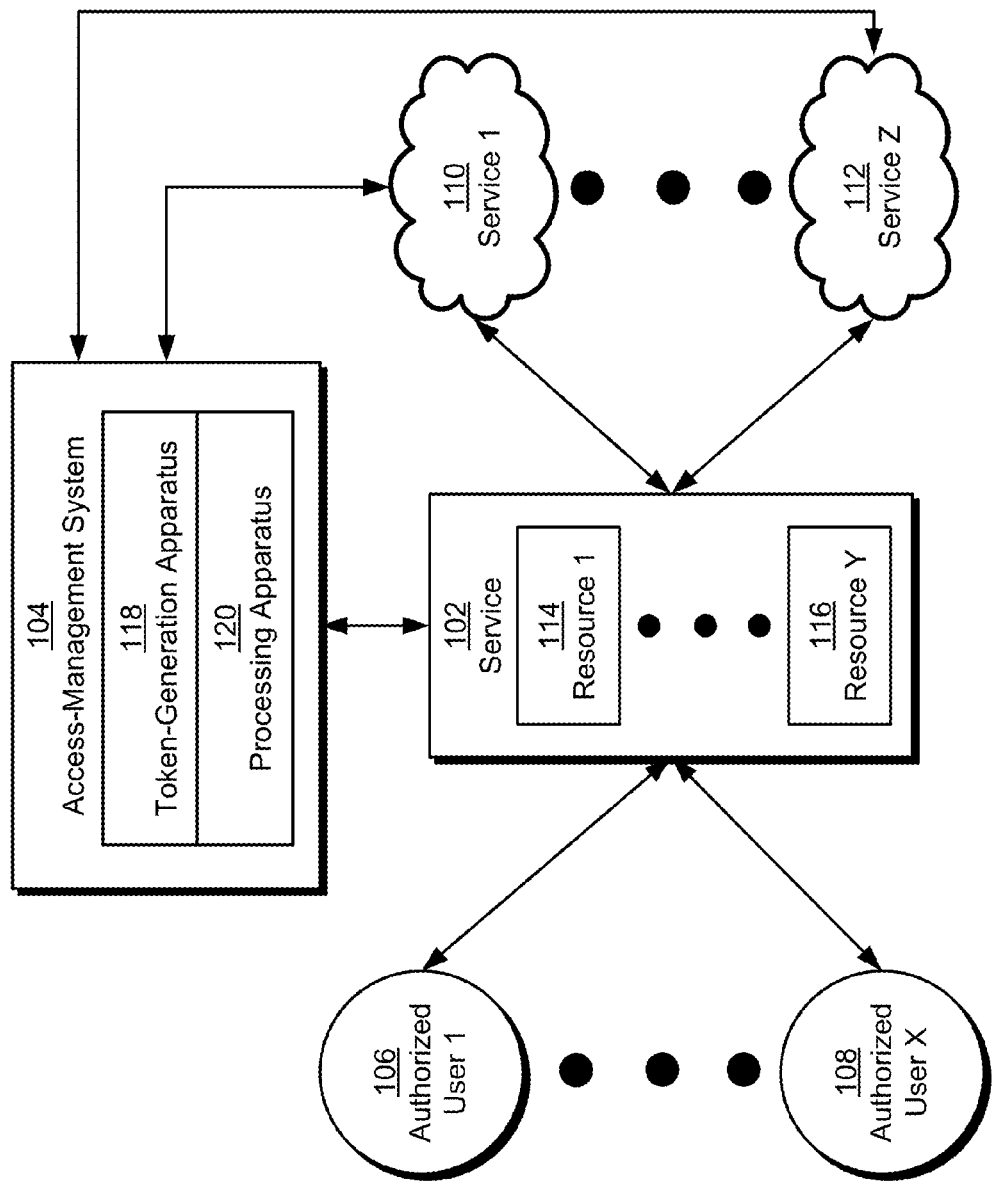
FIG. 1 shows a schematic of a system in accordance with the disclosed embodiments.

FIG. 1 shows a schematic of a system in accordance with the disclosed embodiments. As shown in FIG. 1, a set of authorized users (e.g., authorized user 1 106, authorized user x 108) may access a service 102 such as a native application, mobile application, web service, and/or other service or application from electronic devices such as personal computers, laptop computers, tablet computers, workstations, mobile phones, and/or portable media players.

Service 102 may provide a set of resources (e.g., resource 1 114, resource y 116), such as data and/or one or more features for accessing, storing, and/or manipulating the data, to the authorized users. For example, service 102 may be an accounting application that allows the authorized users to store financial data from bills, invoices, receipts, tax forms, statements, financial accounts, and/or financial documents. The accounting application may also allow the authorized users to perform tasks related to the financial data, such as generating payrolls, tracking inventory, managing invoices, tracking financial transactions, and/or generating reports.

Service 102 may be distributed across one or more machines and accessed in various ways. For example, service 102 may be installed natively on a computer system and executed through an operating system on the computer system. Alternatively, service 102 may be implemented using a client-server architecture, in which service 102 executes on one or more servers and is accessed from other machines using a locally installed executable and/or a web browser and network connection. In other words, service 102 may be implemented using a cloud computing system that is accessed over the Internet.

In addition, the authorized users may be authenticated with service 102 prior to accessing resources associated with (e.g., controlled by) the authorized users on service 102. For example, a user may provide a username and password, biometric identifier, personal identification number (PIN), certificate, and/or other authentication credentials to service 102 prior to retrieving financial account information and/or accessing financial and/or accounting features associated with the authentication credentials on service 102.

Service 102 may further include functionality to allow access to its resources from a number of other services (e.g., service 1 110, service z 112). For example, service 102 may use a mechanism such as OAuth to allow the authorized users to approve access to their resources on service 102 by a set of third-party services such as web applications, native applications, mobile applications, and/or other types of applications without requiring the authorized users to share their authentication credentials with the third-party services.

Those skilled in the art will appreciate that previous authentication of the authorized users with service 102 may be required before the authorized users are able to approve access to their resources on service 102 by the other services. As a result, users who lack authentication credentials with service 102 may have difficulty obtaining approval for access to the resources from the other services. For example, a user may wish to access data on service 102 from a third-party service because the third-party service includes features that are not available on service 102. However, the user may not have a user account with service 102 that authorizes the user to enable third-party access to data on service 102, or the user may have forgotten and/or otherwise misplaced the authentication credentials required to confirm the user's ability to grant such third-party access. Instead, the user may manually walk another user with the appropriate authentication credentials with service 102 (e.g., an authorized user) through the process of enabling third-party access to the data on service 102 and/or obtain the other user's authentication credentials with service 102 to approve the third-party access on the other user's behalf.

In one or more embodiments, the process of obtaining approval for accessing resources on service 102 from other (e.g., third-party) services is streamlined using an access-management system 104 associated with service 102. In particular, access-management system 104 may allow users of third-party services to obtain approval from authorized users of service 102 to access resources on service 102 from the third-party services without requiring the authorized users to re-enter authentication credentials for service 102 and/or manually enable such access from service 102. Access-management system 104 may include a token-generation apparatus 118 and a processing apparatus 120, which may be implemented together and/or separately by one or more hardware and/or software components and/or layers. For example, token-generation apparatus 118 and processing apparatus 120 may be provided by a single physical machine, multiple computer systems, one or more virtual machines, a grid, one or more databases, one or more file systems, and/or a cloud computing system.

First, for each request to access a resource on service 102 from a third-party service, token-generation apparatus 118 may generate an intent token representing the intent associated with the request. For example, token-generation apparatus 118 may create the intent token as a unique passcode (e.g., an "intent code") and/or other alphanumeric identifier and associate the intent token with details of the request, such as the user and/or third-party service from which the request was received and/or the resource requested by the user and/or third-party service.

Next, processing apparatus 120 may provide the intent token in a response to the request. The user associated with the request may then share the intent token with an authorized user of service 102 and/or act as the authorized user, and the authorized user may transmit the intent token back to processing apparatus 120 through service 102. Processing apparatus 120 may then use the intent token from the authorized user to provide information about the request to the authorized user and obtain approval for the request from the authorized user before enabling access to the resource for the user on the third-party service. The operation of token-generation apparatus 118 and processing apparatus 120 is described in further detail below with respect to FIG. 2.

Figure 2:
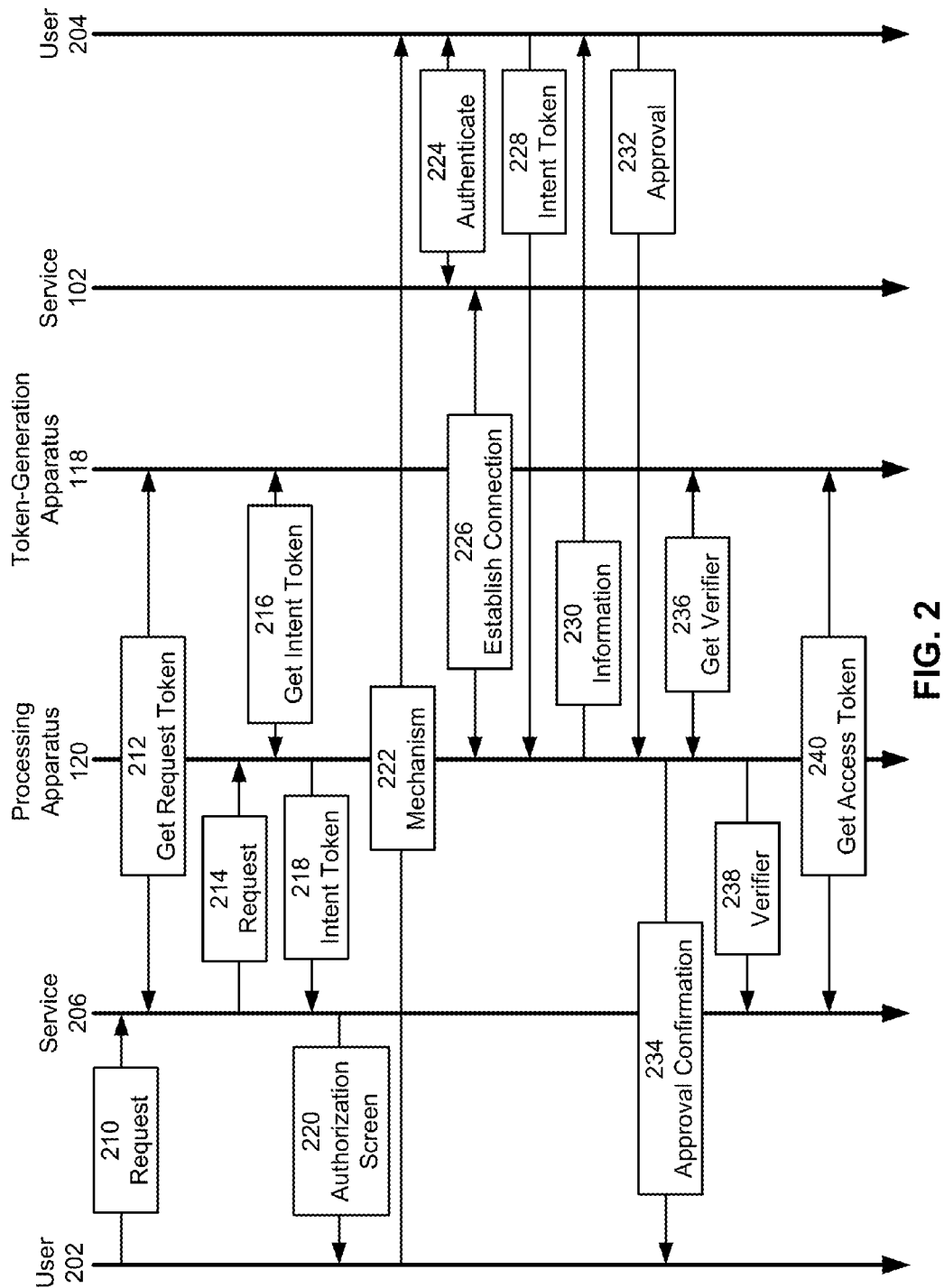
FIG. 2 shows an exemplary sequence of operations involved in enabling access to a resource in accordance with the disclosed embodiments.

FIG. 2 shows an exemplary sequence of operations involved in enabling access to a resource in accordance with the disclosed embodiments. As described above, the resource may be hosted on and/or provided by one service 102, while access to the resource may be requested by a user 202 on another service 206. As shown in FIG. 2, user 202 may submit a request 210 for access to the resource to service 206. For example, user 202 may click on a link and/or other user-interface element in a website, mobile application, and/or native application to request access to data and/or a feature on service 102.

Service 206 may process request 210 by obtaining a request token 212 from token-generation apparatus 118 and including the request token in another request 214 to processing apparatus 120. For example, service 206 may initiate the authorization process for accessing the resource on service 102 from service 206 by obtaining an OAuth request token from token-generating apparatus 118 and submitting a separate OAuth request 214 containing the request token to processing apparatus 120.

In response to request 214, processing apparatus 120 may obtain an intent token 216 from token-generation apparatus 118. The intent token may represent the intent associated with request 210. For example, token-generation apparatus 118 and/or processing apparatus 120 may generate a numeric passcode and/or "intent code" representing the intent token and associate the passcode and/or intent code with user 202, service 206, and/or the requested resource on service 102.

Processing apparatus 120 and/or service 206 may then provide the intent token 218 to user 202 in an authorization screen 220. For example, processing apparatus 120 and/or service 206 may display the authorization screen to user 202 in a web browser. The authorization screen may allow user 202 to provide authentication credentials (e.g., login and password) for service 102, which may allow the user to authorize access to the requested resource from authorization screen 220. If the user does not have the authentication credentials, the user may obtain the intent token from the authorization screen and use the intent token to obtain authorization for the access from user 204.

In particular, user 202 may use a mechanism 222 such as email, SMS, instant messaging, and/or another communications mechanism to transmit the intent token to user 204. The mechanism may be provided with the intent token in the authorization screen. For example, processing apparatus 120 may include a link and/or user-interface element in the authorization screen that allows user 202 to automatically transmit an email, SMS message, instant message, and/or other type of message containing the intent token and instructions for using the intent token to user 204. Alternatively, user 202 may communicate the intent token and/or instructions to user 204 using a communications mechanism that is not provided in the authorization screen. Once the intent token and/or instructions are provided to user 204, the interaction of user 202 with service 206 may be paused, and the remainder of the approval process for access to the resource by user 202 on service 206 may be conducted with user 204 and service 102.

After receiving the intent token from user 202, user 204 may authenticate 224 with service 102, if user 204 is not already logged in. After authenticating with service 102, user 204 may be established as an authorized user who can approve access by user 202 to the resource from service 206.

Next, user 204 may use service 102 to establish a connection 226 with processing apparatus 120 and use the connection to provide the intent token 228 to processing apparatus 120. For example, user 204 may follow instructions provided with the intent token and navigate to a feature on service 102 for enabling access to resources on service 102 from other services (e.g., service 206). User 204 may then input the intent token in a user-interface element (e.g., text field) in the feature, and the feature may transmit the intent token to processing apparatus 120.

In one or more embodiments, user 204 establishes the connection with processing apparatus 120 from a native application (e.g., desktop application, mobile application, etc.) providing service 102. To enable the connection and/or transmission of the intent token from the native application to processing apparatus 120, the native application may transfer a "logged in" state of user 204 (e.g., after the user has authenticated with the native application) to a web browser. The web browser may then be used to establish the connection with processing apparatus 120 and provide the intent token to processing apparatus 120. Such transfer of the "logged in" state from the native application to the web browser is discussed in a co-pending non-provisional application by inventors Timothy E. Hobson, Shrisha Radhakrishna, Kishore Jonnalagedda, Soumendra Daas, Bibhakar Ranjan, and Douglas L. Foiles, entitled "Transitioning a Logged-In State from a Native Application to Any Associated Web Resource," having Ser. No. 13/762,168, and filing date 7 Feb. 2013, which is incorporated herein by reference.

After obtaining the intent token from user 204 through service 102, processing apparatus 120 may provide information 230 related to the request and/or intent token to user 204 and obtain approval 232 for the request from user 204. For example, processing apparatus 120 may update the web browser used by user 204 to provide the intent token with a webpage describing service 206 and/or the resource requested by service 206. Processing apparatus 120 may further include a button and/or other user-interface element in the webpage that allows user 204 to approve the request after reviewing the information.

Once approval 232 is obtained from user 204, processing apparatus 120 may enable access to the resource on service 102 for user 202 on service 206. First, processing apparatus 120 may resume interaction with user 202 by showing an approval confirmation 234 to user 202. For example, processing apparatus 234 may update the user interface and/or application (e.g., a web browser) in which authorization screen 220 was displayed with a message confirming approval from user 204 and/or service 102 to access the resource from service 206. Processing apparatus 120 may also obtain a verifier 236 (e.g., an OAuth verifier) for the request token from token-generation apparatus 118 after receiving the approval from user 204 and provide the verifier 238 to service 206. Finally, service 206 may exchange the request token and verifier for an access token 240 (e.g., an OAuth access token) from token-generation apparatus 118 and use the access token to connect to service 102 and access the resource on service 102.

Because the authorization process uses the intent token along with request tokens, verifiers, access tokens, and/or other mechanisms associated with an authorization standard such as OAuth, customization of services 102 and/or 206 may not be required to enable use of the intent token in streamlining approval of access to the resource by user 204. Instead, exchange of the intent token and approval from user 204 may be accomplished by displaying and/or obtaining the intent token through standard mechanisms for requesting and/or granting authorization in OAuth, such as authorization and/or login pages.

FIG. 3A shows an exemplary screenshot in accordance with the disclosed embodiments. More specifically, FIG. 3A shows a screenshot of a user interface for providing an intent token 302 to a user. For example, the user interface of FIG. 3A may be shown to a user of a first service who wishes to gain access to a resource on a second service from the first service.

As shown in FIG. 3A, intent token 302 may be a numeric passcode (e.g., 16427804) that is provided, along with a set of instructions 304, to the user. The passcode may be an "intent code" that represents the user's intent to gain access to the resource on the second service from the first service. The user may follow instructions 304 to enable access to the resource by providing intent token 302 within the second service (e.g., "QuickBooks"), if the user is able to use the second service to grant access to the resource from other services. If the user is not authorized to grant access to the resource, the user may provide intent token 302 and instructions 304 to an authorized user of the second service so that the authorized user may approve the access through the second service. The user may alternatively click on a link 306 (e.g., "sign in") to provide authentication credentials for the second service and approve the access without using intent token 302.

Figure 3B:
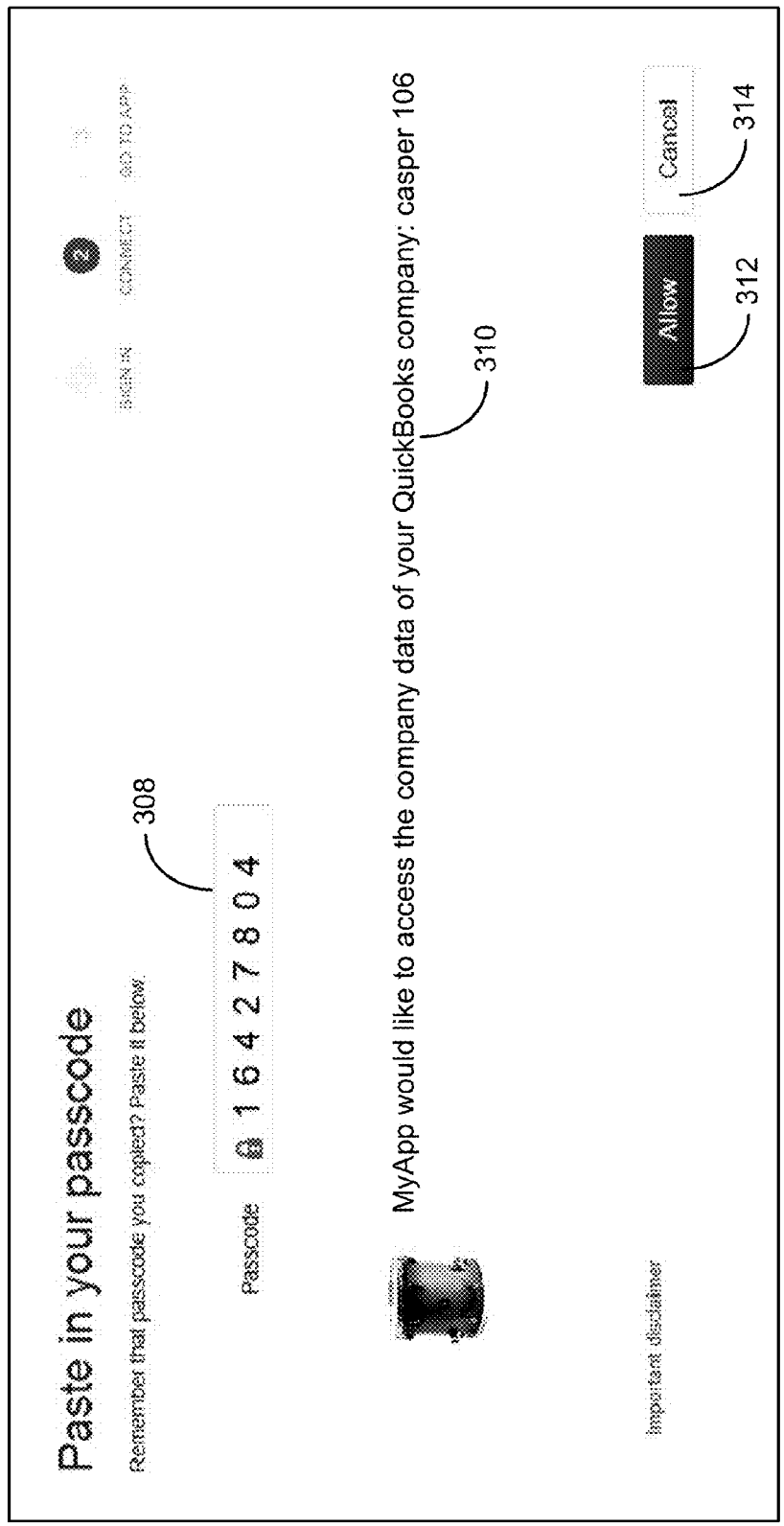
FIG. 3B shows an exemplary screenshot in accordance with the disclosed embodiments.

FIG. 3B shows an exemplary screenshot in accordance with the disclosed embodiments. In particular, FIG. 3B shows a screenshot of a user interface for approving access to the resource on the second service for the user of the first service. For example, the user interface of FIG. 3B may be accessed from the second service by an authorized user of the second service, such as a user who is authenticated with the second service and has ownership of the resource.

As shown in FIG. 3B, the authorized user has entered the passcode from FIG. 3A into a user-interface element 308 such as a text box. In response to the entered passcode, the user interface of FIG. 3B includes information 310 related to the request represented by the passcode (e.g., "MyApp would like to access the company data of your QuickBooks company: casper 106"). For example, information 310 may allow the authorized user to identify the first service (e.g., "MyApp") and the resource (e.g., company data of "casper 106") associated with the request. The user may select a user-interface element 312 (e.g., "Allow") to approve the request and enable access to the resource by the first service, or the user may select a user-interface element 314 (e.g., "Cancel") to exit the user interface of FIG. 3B without approving the request.

Figure 3C:
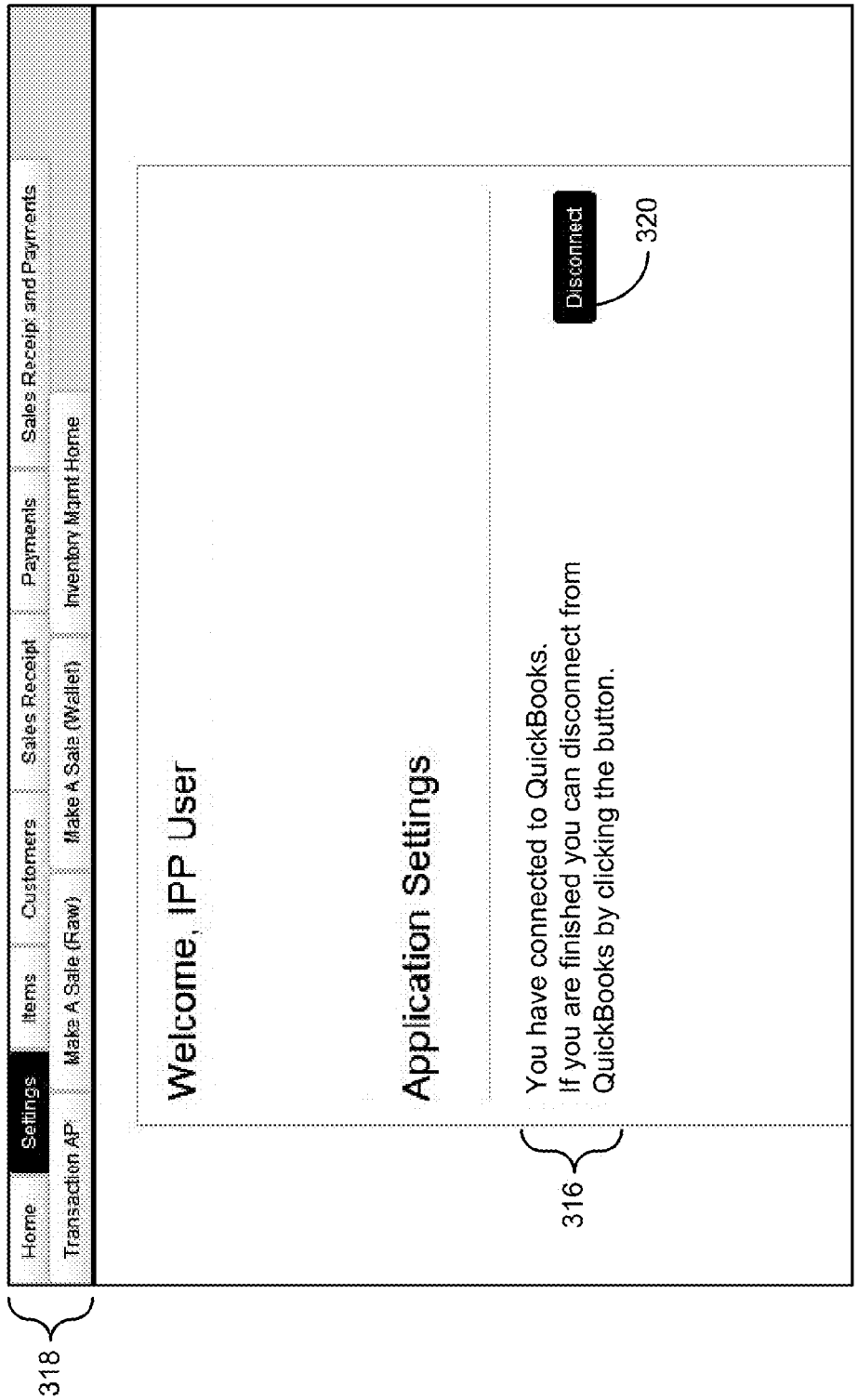
FIG. 3C shows an exemplary screenshot in accordance with the disclosed embodiments.

FIG. 3C shows an exemplary screenshot in accordance with the disclosed embodiments. More specifically, FIG. 3C shows a screenshot of the user interface of FIG. 3A after the request is approved through the user interface of FIG. 3B. The user interface of FIG. 3C includes a message 316 indicating that the request has been approved and the user is able to access the resource on the second service (e.g., "QuickBooks") from the first service.

The user may access one or more features 318 from the user interface to access the resource and/or perform one or more tasks using the resource. For example, the user interface of FIG. 3C may be provided by a web application and allow the user to manage payments, sales, and/or transactions associated with company data from an accounting application connected to the web application. After the user has finished using the resource (e.g., the company data) on the second service (e.g., the accounting application) from the first service (e.g., the web application), the user may select a user-interface element 320 (e.g., "Disconnect") to discontinue access to the resource on the second service from the first service.

Figure 4:
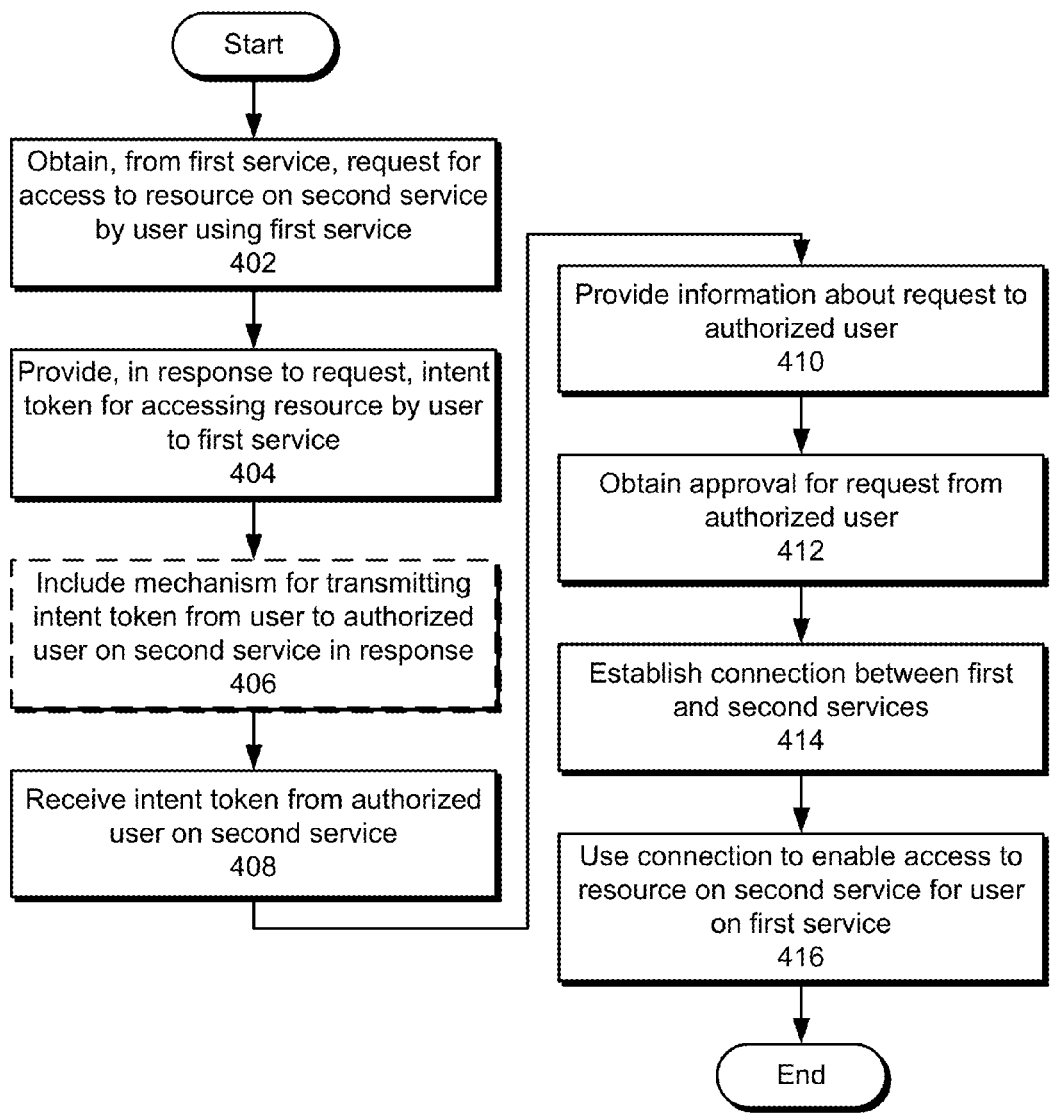
FIG. 4 shows a flowchart illustrating the process of enabling access to a resource on a service by a user on a different service in accordance with the disclosed embodiments.

FIG. 4 shows a flowchart illustrating the process of enabling access to a resource on a service by a user on a different service in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a request from a first service for access to the resource on a second service by a user using the first service is obtained (operation 402). The request may include a request token, such as an OAuth request token. As a result, the request may be used to initiate the process of authorizing access to the resource on the second service for the user on the first service.

Next, an intent token for accessing the resource by the user is provided to the first service in response to the request (operation 404). The intent token may represent the intent associated with the request. For example, the intent token may be a passcode, "intent code," and/or other piece of data that is associated with details of the request, such as the first service, the user, and/or the resource.

The response may optionally include a mechanism for transmitting the intent token from the user to an authorized user on the second service (operation 406). For example, the response may include a user-interface element that allows the user to automatically transmit the intent token and instructions for using the intent token in an email, SMS message, instant message, and/or other type of message to the authorized user. Alternatively, the user may use a communications mechanism not included in the response to share the intent token with the authorized user. After the intent token is provided to the user, interaction with the user on the first service may be paused for the remainder of the process of authorizing access to the resource.

The process may continue with the receipt of the intent token from the authorized user on the second service (operation 408). For example, the authorized user may be authenticated with the second service to establish his/her ability to approve access to the resource for the user on the first service. The authorized user may then provide the intent token using an authorization feature and/or web page accessed from the second service.

After the intent token is received from the authorized user, information about the request is provided to the authorized user (operation 410), and approval for the request is obtained from the authorized user (operation 412). For example, the intent token from the authorized user may be matched to the request, and information related to the request (e.g., the first service, the requested resource, etc.) may be displayed to the authorized user. The authorized user may also be given the option to approve or deny the request.

Once approval for the request is obtained from the authorized user, access to the resource on the second service is enabled for the user on the first service. In particular, a connection is established between the first and second services (operation 414) and used to enable access to the resource for the user (operation 416). For example, the approval may be used to generate and provide an OAuth verifier for the request token from the request to the first service, and the first service may use the verifier and request token to obtain an OAuth access token for the resource. The first service may then use the OAuth access token to connect to the second service and access the resource on the second service.

Figure 5:
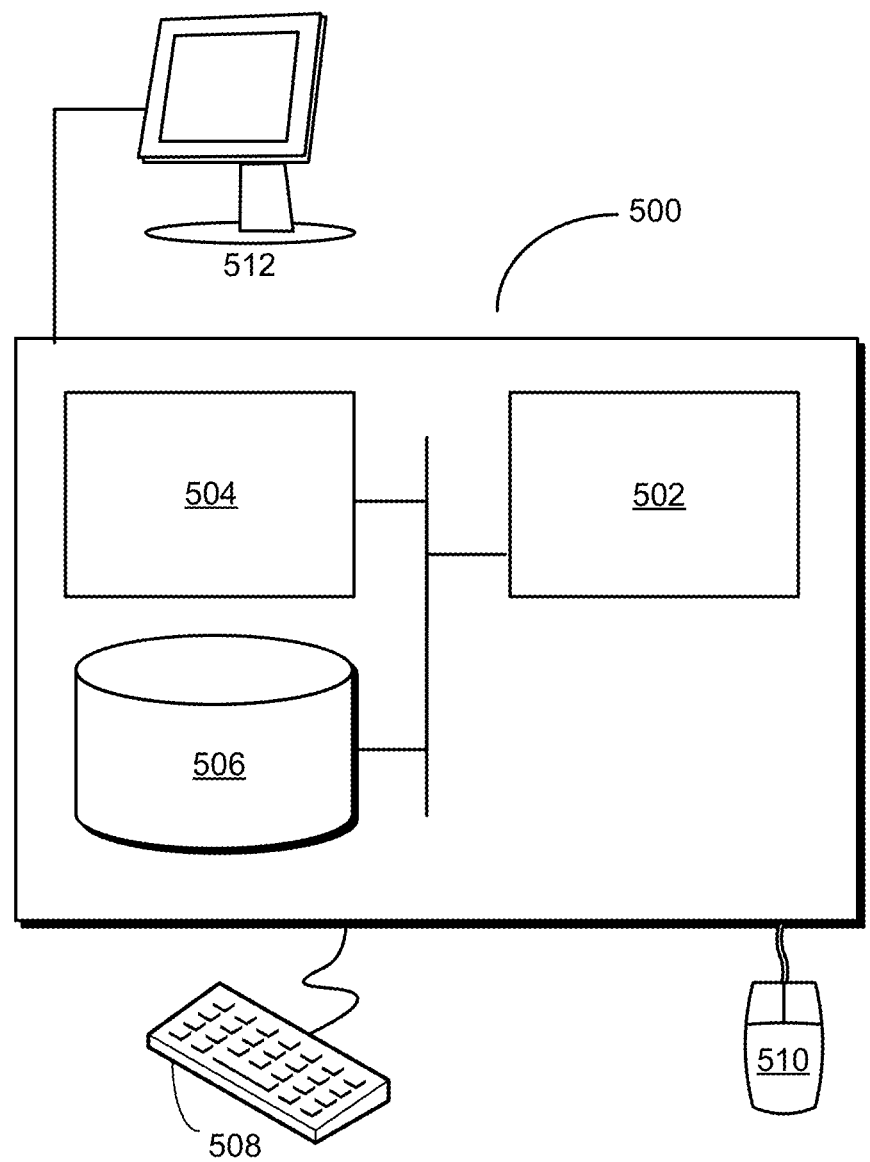
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for enabling access to a resource. The system may include a token-generation apparatus that provides an intent token for accessing the resource for a user using a first service when the resource is on a second service. The system may also include a processing apparatus that obtains, from the first service, a request for access to the resource by the user. The processing apparatus may also provide the intent token to the first service in a response to the request. Upon receiving the intent token from an authorized user on the second service, the processing apparatus may enable access to the resource on the second service for the user on the first service.

In addition, one or more components of computer system 500 may be remotely located and connected to the other components over a network. Portions of the present embodiments (e.g., token-generation apparatus, processing apparatus, first service, second service, etc.) may also be located on different nodes of a distributed system that implements the embodiments. For example, the present embodiments may be implemented using a cloud-computing system that enables access to resources on a service from a set of remote users and/or other services.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for enabling access to a resource on a second computing service, comprising:
   receiving, from a first computing service, a request for access to the resource on the second computing service;
   upon receiving the request, generating an intent token associated with the
   request and providing the intent token to a user accessing the first computing service, wherein the intent token encodes an identification of the user and resource on second computing service, wherein the intent token is provided in conjunction with a mechanism for transferring the intent token from the user accessing the first computing service to an authorized user of the second computing service;
   receiving, from the second computing service, the intent token from the authorized user; and
   upon receiving the intent token from the authorized user and matching the token with the request, providing information about the request to the authorized user after receiving the intent token from the authorized user;
   receiving approval for the request from the authorized user prior to enabling access to the resource for the user accessing the first computing service;
   enabling access to the resource on the second computing service for the user accessing the first computing service, wherein enabling access to the resource on the second computing service comprises:
      establishing a connection between the first service and the second computing service, and
      providing the first computing service with access to the resource on the second computing service for the user accessing the first computing service.

2. The computer-implemented method of claim 1, wherein the mechanism comprises a link or a user-interface element that allows the user to transmit the intent token to the authorized user using at least one of: an email, a Short Message Service (SMS) message, and an instant message.

3. The computer-implemented method of claim 1, wherein the authorized user is authenticated with the second computing service.

4. The computer-implemented method of claim 1, wherein the intent token comprises a passcode.

5. The computer-implemented method of claim 1, wherein the first and second computing services comprise a web service and a native application.

6. The computer-implemented method of claim 1, wherein the request comprises a request token.

7. A system for enabling access to a resource on a second computing service, comprising:
- a token-generation apparatus configured to generate an intent token associated with a request from a user accessing a first computing service for access to the resource on the second computing service, wherein the intent token encodes an identification of the user and resource on second computing service; and
- a processing apparatus configured to:
  - receive, from the first computing service, the request for access to the resource;
  - provide the intent token to the user accessing the first computing service, wherein the intent token is provided in conjunction with a mechanism for transferring the intent token from the user accessing the first computing service to an authorized user of the second computing service;
  - receive from the second computing service, the intent token from the authorized user; and
  - upon receiving the intent token from the authorized user and matching the intent token with the request, provide information about the request to the authorized user after receiving the intent token from the authorized user;
  - receive approval for the request from the authorized user prior to enabling access to the resource by the user for the first computing service;
  - enable access to the resource on the second computing service for the user accessing the first computing service, wherein enabling access to the resource on the second computing service comprises:
    - establishing a connection between the first service and the second computing service, and
    - providing the first computing service with access to the resource on the second computing service for the user accessing the first computing service.

8. The system of claim 7, wherein the first and second computing services comprise a web service and a native application.

9. The system of claim 7, wherein the intent token comprises a passcode.

10. A non-transitory computer-readable storage medium storing instructions that when executed by a computer cause the computer to perform a method for enabling access to a resource on a second computing service, the method comprising:
- receiving, from a first computing service, a request for access to the resource on the second computing service;
- upon receiving the request, generating an intent token associated with the
- request and providing the intent token to a user on first computing service, wherein the intent token is provided in conjunction with a mechanism for transferring the intent token from the user accessing the first computing service to an authorized user of the second computing service;
- receiving, from the second computing service, the intent token from the authorized user; and
- upon receiving the intent token from the authorized user and matching the intent token with the request, providing information about the request to the authorized user after receiving the intent token from the authorized user; and
- receiving approval for the request from the authorized user prior to enabling access to the resource for the user accessing the first computing service;
- enabling access to the resource on the second computing service for the user accessing the first computing service, wherein enabling access to the resource on the second computing service comprises:
  - establishing a connection between the first service and the second computing service, and
  - providing the first computing service with access to the resource on the second computing service for the user accessing the first computing service.

11. The non-transitory computer-readable storage medium of claim 10, wherein the first and second computing services comprise a web service and a native application.

* * * * *